United States Patent [19]

Smith et al.

[11] Patent Number: 4,515,210

[45] Date of Patent: May 7, 1985

[54] HEAT EXCHANGER HAVING A PLASTICS MEMBRANE

[75] Inventors: John Smith, Cardiff; David A. Boiston, Nuneaton, both of England

[73] Assignee: Courtaulds PLC, London, England

[21] Appl. No.: 414,340

[22] PCT Filed: Jan. 14, 1982

[86] PCT No.: PCT/GB82/00006

§ 371 Date: Aug. 12, 1982

§ 102(e) Date: Aug. 12, 1982

[87] PCT Pub. No.: WO82/02427

PCT Pub. Date: Jul. 22, 1982

[30] Foreign Application Priority Data

Jan. 15, 1981 [GB] United Kingdom ............... 8101262
Jan. 13, 1982 [EP] European Pat. Off. ......... 82300170.6

[51] Int. Cl.$^3$ ............................................. F23F 13/02
[52] U.S. Cl. ..................................... 165/133; 165/180; 261/112; 423/274; 525/333.7; 525/333.8; 525/333.9; 525/344; 525/345
[58] Field of Search ............... 525/333.7, 333.8, 333.9, 525/344, 345; 165/133, 180; 423/274; 261/112

[56] References Cited

U.S. PATENT DOCUMENTS

| Re. 24,062 | 9/1955 | Horton | 525/333.7 |
| 3,231,490 | 1/1966 | Fry | 261/112 |
| 3,289,754 | 12/1966 | Erb et al. | 165/133 |
| 3,426,814 | 4/1969 | Johnson . | |
| 3,551,393 | 12/1960 | Muzyczko | 525/344 |

FOREIGN PATENT DOCUMENTS 802974 10/1958 United Kingdom .
952111 3/1964 United Kingdom .

*Primary Examiner*—Albert W. Davis, Jr.
*Attorney, Agent, or Firm*—Howson and Howson

[57] ABSTRACT

The wettability of polyolefin or polyester film for use as a heat exchange membrane, e.g. tubes or sheets, in a heat exchanger is increased, generally to a surface tension reading in excess of 70 dynes/cm, by treating the surface of the film with a strong oxidizing agent, particularly gaseous sulphur trioxide. The heat transfer coefficient is thereby improved. Tubes of such plastics material having a treated outer surface and an untreated inner surface are particularly useful for exchanging heat between a liquid flowing over the outer surface and a gas or vapor condensing within the tube.

6 Claims, No Drawings

HEAT EXCHANGER HAVING A PLASTICS MEMBRANE

TECHNICAL FIELD

This invention relates to a heat exchanger which utilises a plastics film material as a membrane through which heat is to be transferred between fluids, especially between two liquids or between a liquid and a gas or vapour.

BACKGROUND ART

It has been proposed to use plastics film as the membrane through which heat is to be transferred between fluids in a heat exchanger because, compared with the metals which are conventionally used, it is inexpensive, resistant to corrosion and comparatively easy to replace.

The low price of polyolefin and polyester films makes them attractive for this use, but they suffer from the fact that their surfaces are not naturally wettable. This means that heat transfer coefficients are reduced because liquids flowing over the surfaces of the film do so as droplets rather than as the desired liquid film. Various treatments have been given to polyethylene film in particular to make it more wettable, including subjecting it to ionising radiation from a corona discharge and coating it with silica, but to our knowledge this has not resulted in any treated films which combine cheapness with retention of wettability over extended periods of use.

DISCLOSURE OF INVENTION

According to this invention, a heat exchanger for exchanging heat between fluids and having a heat exchange membrane through which heat is transferred from one fluid to another is characterised in that the membrane comprises a polyolefin or polyester film of which one or both surfaces have been given increased wettability by a treatment with an oxidising agent selected from the group consisting of sulphur trioxide, ozone, oleum, chlorosulphonic acid and chromosulphuric acid.

The polyolefin may be a homopolymer or copolymer, for example low density or high density polyethylene, polypropylene, copolymers of ethylene and propylene with each other and/or other olefin monomers, or silylated ethylene copolymers such as those made by Dow Corning Corporation under the trade name "Sioplas E". The polyester may be a homopolyester or co-polyester and preferably comprises poly(ethylene terephthalate).

The oxidising agent used to treat the film may be gaseous or liquid. The preferred agent is gaseous sulphur trioxide. With such powerful oxidising agents the desired wettability can be imparted with treatment times as short as a minute or less. More extended treatments are unnecessary in relation to wettability, and, as the film is progressively degraded as the treatment proceeds, it is prudent to keep the treatment time to the minimum required.

With sulphur trioxide, oleum, chlorosulphonic acid and chromosulphuric acid, the treatment can be carried out at room temperature; any elevation of temperature tends to make the reaction of the oxidising agent with the plastics film too vigorous, so that control of the treatment is more difficult. With ozone, higher temperatures are preferred to give a reasonably rapid reaction rate leading to satisfactory results after short treatment times, 60° to 80° C. being a suitable range.

The heat exchange membrane may be in any form which is suitable for plastics film but is preferably in the form of a tube or sheet. The treatment of the tube or sheet may be carried out as a continuous process by passing the tube or sheet in continuous form through a vessel containing the strong oxidising agent. Both faces of the film may be treated where the heat exchange is to be between liquid phases, but it is advantageous to leave one face untreated and therefore less wettable if it is to be contacted by a condensing vapour.

With a tube, it is comparatively easy to treat the outer surface only, for example directly after extrusion, in which case the outer surface will be of greater wettability than the inner surface. Such tubes are useful in heat exchangers in which a liquid is passed over a tube bundle to be heated by a vapour condensing within the tubes. One process of this type involves passing a film of brine or other aqueous liquor over the tube bundle, compressing the water vapour evaporated therefrom and condensing it at a higher temperature within the tubes to provide the energy for evaporation. Whether the tubes are vertical, as in a falling film evaporator, or are present as a substantially horizontal bundle, it is important that their outer surfaces are wettable so that the liquor film is spread over as large an area of heat transfer surface as possible.

The wettability of plastics film may be assessed by a standard ASTM test D 2578-67 (revised 1972). This test assesses the wettability in terms of the surface tension of a liquid which wets the plastics film. For assessing the water wettability of various films, the standard test was used with the sole variation that a No. 6 coating rod was used instead of a cotton-tipped stick because it gave more reproducible results.

Using this test, it is preferred that the treated film of the heat exchanger according to the invention should give a surface tension reading of at least 70 dynes/cm. Untreated low-density polyethylene film gives a surface tension reading of 32 dynes/cm, and low-density polyethylene film which has been subjected to corona discharge gives a surface tension reading in the range 40 to 60 dynes/cm depending upon the time and intensity of treatment. Film made of "Sioplas E", the silylated ethylene copolymer, gives a surface tension reading of 31 dynes/cm in the uncrosslinked state, improving to 47 dynes/cm after crosslinking has been effected by boiling the film in water for 2½ hours.

After treatment with an oxidising agent according to the invention, each of the above films is able to give a surface tension reading in excess of 72 dynes/cm, as shown by the following non-limiting Examples:

MODES FOR CARRYING OUT THE INVENTION

Example 1

A heat exchange tube of 1.616 cms external diameter comprised low density polyethylene film of 0.1237 mm gauge. A one meter length of tubing was taken and heat sealed at both ends before being inserted into a flask. An atmosphere of 2 percent by volume of ozone in oxygen at a temperature of 70° C. was passed through the flask so that the outer surface of the tube was subjected to treatment by the ozone. After one minute of this treatment the atmosphere of the flask was flushed out with cold air and the treated tubing was removed. Its surface was visibly unchanged but, when tested for wettability according to the test described previously, gave a surface tension reading in excess of 72 dynes/cm. The inner surface of the tube was apparently unaffected by the treatment and gave a surface tension reading of 32 dynes/cm.

Example 2

The procedure of Example 1 was repeated using a different atmosphere for treating the tubing, namely 50 percent by volume of sulphur trioxide in air, and a different temperature, namely 25° C.

On removal from the flask, the tube was washed with water and its treated surface was seen to have turned black. When tested, this surface gave a surface tension reading in excess of 72 dynes/cm. The inner surface was again apparently unaffected and gave a surface tension reading of 31 dynes/cm.

Example 3

The procedure of Example 1 was repeated using oleum (25% $SO_3$) as the treatment medium instead of ozone and without through flow. The oleum was maintained at 25° C. and the treatment time was reduced to 30 seconds.

Upon removal from the flask, the tube was washed with water and, again, was seen to have turned black. The surface tension reading for the treated outer surface was in excess of 72 dynes/cm and for the untreated inner surface was 30 dynes/cm.

Examples 4, 5 and 6

The procedures of Examples 1, 2 and 3 were repeated on heat exchange tubing made from "Sioplas E" rather than low density polyethylene with the same result in each case.

We claim:

1. In a heat exchanger having means for separately introducing and withdrawing two fluids between which heat is to be transferred, said fluids being separated in said exchanger by heat exchange membrane through which heat is transferred from one fluid to the other, the improvement which comprises employing as said membrane a polyolefin or polyester film, at least one surface of which has been given greater wettability by having been treated with an oxidizing agent selected from the group consisting of sulphur trixoide, ozone, oleum, chlorosulphonic acid and chromosulphuric acid, whereby the fluid in contact with said treated surface of said film flows over said surface as a liquid film.

2. A heat exchanger as claimed in claim 1 characterised in that the film comprises an ethylene homopolymer or copolymer.

3. A heat exchanger as claimed in claim 1 or claim 2 characterised in that the film is in the form of a tube or sheet.

4. A heat exchanger as claimed in claim 3 characterised in that the film is in the form of a tube which has been treated with the said oxidising agent on the outer surface only.

5. A heat exchanger as claimed in claim 1 or claim 2 characterised in that the treated surface of the film has been treated with gaseous sulphur trioxide.

6. A heat exchanger as claimed in claims 1 or 2 characterized in that the treated surface of the film has a wettability as measured by the test described in the specification such that it is wetted by a liquid having a surface tension of 70 dynes/cm.

* * * * *